United States Patent Office 3,525,842
Patented Aug. 25, 1970

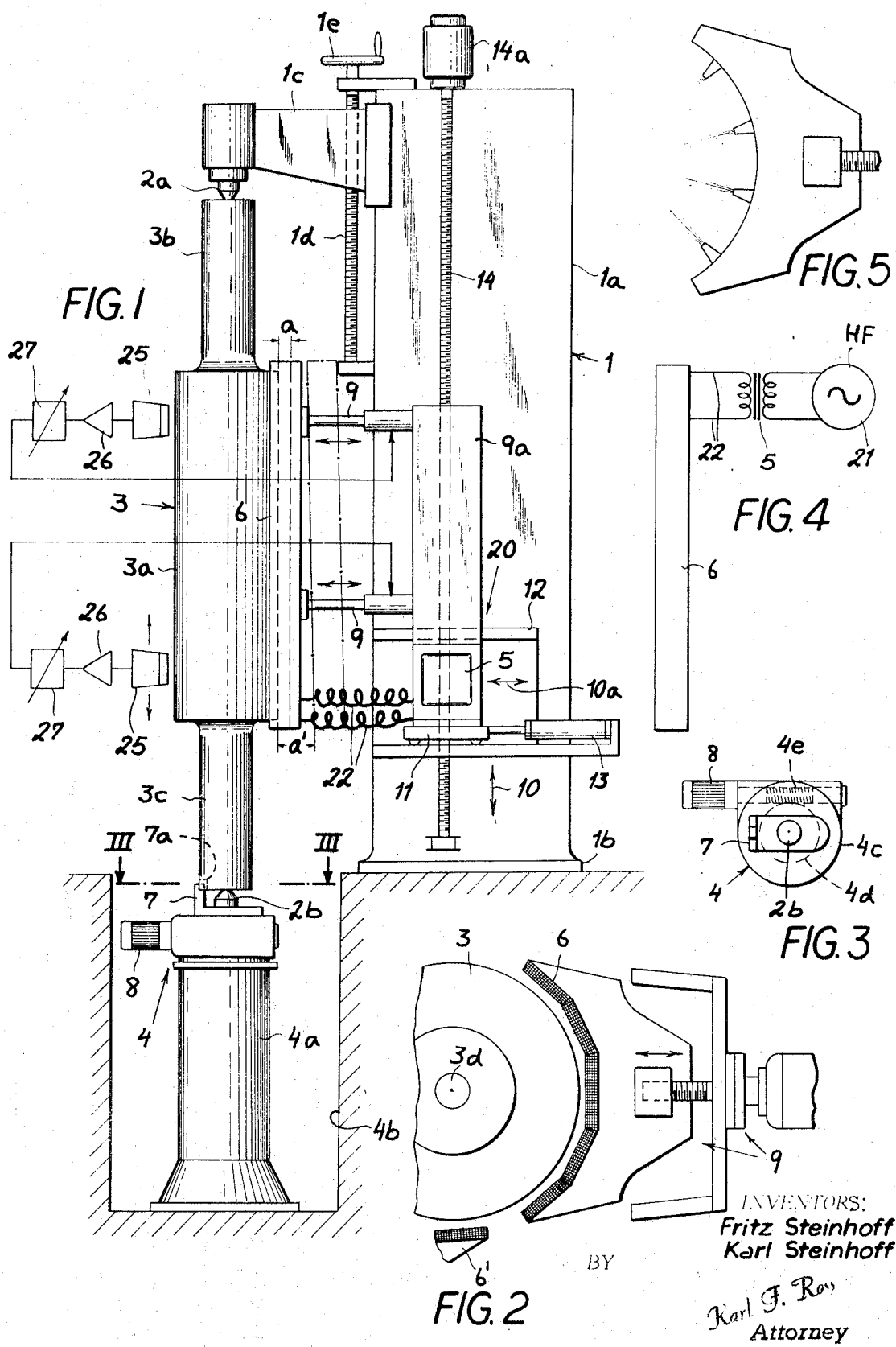

3,525,842
APPARATUS FOR THE HEAT-TREATMENT OF ROUND BODIES
Fritz Steinhoff, Sudturmweg 3, Bucholtwelmen, Germany, and Karl Steinhoff, Voerderstr. 121, Dinslaken, Germany
Filed Sept. 19, 1968, Ser. No. 760,915
Claims priority, application Germany, Sept. 23, 1967, 1,583,413
Int. Cl. H05b 5/00, 9/02
U.S. Cl. 219—10.57     9 Claims

ABSTRACT OF THE DISCLOSURE

Apparatus for the hardening heat-treatment of rollers wherein the roller body is held at opposite ends rotatably in an upright position adjacent a support. At least one induction heating unit is mounted on this support and extends longitudinally along the roller while confronting only a limited segment of its periphery. The induction heating unit has longitudinally offset portions adapted to be spaced at different distances from said body by respective positioning servomotors interposed between each of the portions and the support.

---

Our present invention relates to an apparatus for the heat-treatment of round bodies and, more particularly, to a device for the heat-treatment of rollers and the like, especially the induction heating of surface zones of rolling-mill rolls, conveyor rollers and the like.

The heat-treatment of metal bodies so as to temper or harden surface zones thereof may use various heating techniques and recent developments in these fields have concentrated upon induction heating of surface zones of metal bodies. The uniform hardening of round bodies at their surface zones has, of course involved difficulties mainly because conventional induction furnaces are incapable of uniformly heating the entire periphery of the round body to the desired temperatures. This disadvantage becomes significant when the round body is a rolling-mill roll for a steel-fabrication plant or a conveyer roller for the transport of ingots, billets or blooms or part of a conveyer system for the transport of other relatively hard bodies which are capable of marring the surface of the roller.

Consequently, it has been proposed to overcome these disadvantages by providing an apparatus for the induction heating over limited axial zones of such rollers along the surface regions thereof which includes a support or frame with a toroidal or cylindrical coil through which the roller is passed in an upright position. Conventional arrangements of this type have not, however, proved to be fully satisfactory, especially since the support frames and arrangements were inordinately complex and expensive and because the vertical displacement of the coil was necessary to heat the entire axial length of the roller during the process. As a result, heating in the axial direction was found to be nonuniform inasmuch as the heating coil could be juxtaposed with only a limited portion of the axial length of the roller at any given instant. As a consequence, such systems have not widespread acceptance in spite of their theoretical desirability for the heat treatment of the roller and the like. Furthermore, these devices could not readily accommodate rolls of different diameters.

The principal object of the present invention is, therefore, to provide an improved arrangement for the inductive heat-treatment of rolls and rollers which overcomes the disadvantages of the earlier systems mentioned above and is capable of ensuring uniform heating both in the axial direction and in the circumferential sense.

This object and others which will become apparent hereinafter are attained, in accordance with the present invention, in a device having a support frame or structure within which the roller can be engaged between centers in an upright position so as to be vertically displaceable. The present invention results in a system whereby the inductivity geometrically affects the roller only along a segment of the periphery of the roller but advantageously over the entire length of the region to be heat-treated while means is provided firstly for positioning the heating coil in the radial direction with respect to the roller, and in the vertical direction (i.e. parallel to its axis). This system eliminates the necessity prevalent heretofore of passing the roller axially through the coil and ensures a constant spacing between the periphery of the roller and the induction coil at any point along the circumference of the periphery. Numerous rolls of various diameters can thus be treated without replacement of the induction-heating coil and without the undesirable side effects that the heat treatment will vary from roll to roll in accordance with the relative diameters of roller and coil.

According to an important feature of this invention, the device is provided with axially spaced positioning units, e.g. fluid or electrical servomotors, adapted to shift respective portions of the induction-heating element toward and away from the periphery of the roller to maintain the temperature along the periphery constant regardless of the axial position of the induction-heating element or vary the temperature as may be required to compensate for differing physical phenomena. In accordance with this aspect of the invention, the heating element or elements which extend angularly over at most a segment of the cylindrical roller periphery, is mounted upon a vertically and horizontally shiftable carriage via a plurality of vertically spaced positioning units operable independently of the means for radially shifting the carriage.

While it is advantageous, from the standpoint of uniform heating of the body over its entire length to provide heating elements which are of equal or greater length, it has been found that the degree of uniformity is increased when the carriage is reciprocated axially as well. Since the distance between the induction heating element and the body to be heated will depend upon the thermal dissipation conditions, local composition phenomena and the like, this spacing will generally vary as the carriage is shifted axially relative to the roller. Also, it is possible to adjust the temperature simply by increasing or decreasing the spacing, thereby using the principles disclosed immediately above to maintain a constant temperature or obtain any desired temperature gradient. While the longitudinally extending induction-heating elements are preferably deformable in the vertical plane to constitute the separately shiftable portions, it will be understood that it is also possible, but less desirable to axially subdivide the induction-heating elements.

Furthermore, once it is determined what relationship is to exist between the radial movements of the positioning movements and the axial movement of the carriage for a given roller configuration and diameter, it is possible to program such movement in accordance with the present invention and thereafter use the program to operate the heating device to process other rollers of the same diameter and configuration. Moreover, the differing spacings of upper and lower portions of the induction heating elements may be obtained by simply tilting the elongated heating elements.

For the heat treatment of exceptionally large-diameter bodies, I may provide a number of such stands with respective carriages, positioning units and induction heating elements at angularly spaced locations about the upright roll to ensure conformity of heating all around the latter. Furthermore, we may provide means enabling the dismounting of the heating elements and their replacement by spray heads capable of directing streams of quenching fluid against the surface of the heat-treated body. A further feature of this invention resides in the mounting of the induction-heating transformer directly upon the moving carriage constiuting the means for shifting the heating element, the transformer being disposed preferably beneath the heating elements. The transformer thus may be shifted relatively to the body along with the heating elements by the axial and horizontal shifting means while the elements are in addition displaceable by the positioning units. The heating elements may be energized in parallel or in a series loop and may be composed of vertical induction-heating rods and the like. This system has the advantage that the induction-heating system can heat-treat rollers of varying diameters without passing the roller through induction-heating coils and also affords a simpler technique for the uniform heating of bodies than has been provided heretofore.

The above and other objects, features and advantages of the present invention will become more readily apparent from the following description, reference being made to the accompanying drawing in which:

FIG. 1 is a vertical elevational view of an induction-heating apparatus in accordance with the present invention;

FIG. 2 is a plan view of a portion of one of the positioning units;

FIG. 3 is a view taken along the line III—III of FIG. 1 with the workpiece removed;

FIG. 4 is a diagram illustrating the electrical circuitry of this system; and

FIG. 5 is a plan view of a quenching head adapted to be used with apparatus of FIG. 1.

In the drawing, we show an apparatus for heat-treatment of a transport or rolling-mill roller 3 having a relatively large-diameter central portion 3a to be heat-treated and a pair of stub shafts 3b and 3c for supporting the working portion of the roller. The apparatus of FIG. 1 comprises a support stand 1 consisting of upright 1a carried by a pedestal 1b and slidably supporting a clamping arm 1c which is vertically shiftable by a spindle 1d rotated by the hand wheel 1e. The arm 1c forms a tail stock for a turning support for the roller 3 and carries a center 2a whose conical tip fits into the the center-drilled recess 3d (FIG. 2) of the roller 3. The other center 2b is mounted upon a pedestal 4a received in a recess 4b below grade and carrying a drive arrangement which has been designated generally at 4 (FIGS. 1 and 3).

The drive arrangement, as can be seen from FIG. 3, comprises a housing 4c for a worm wheel 4d which drives the center 2b and a dog 7, an upstanding projection 7a of which engages a notch in the stub shaft 3c of the roll 3. The worm wheel 4d is driven by a worm 4e which, in turn, is rotated by the motor 8. The roller 3 is thus rotatably mounted in a vertical position between the centers 2a and 2b and is driven by the motor 8 about its axis with respect to the stand 1.

The stand 1 (FIG. 1) is formed with a lead screw 14, driven by motor 14a, which vertically shifts a carriage generally identified at 20, this carriage comprising a pair of horizontal rails 12 in which a slide 11 is guided. The slide 11 carries the transformer 5 as well as a post 9a along which a number of positioning units 9 are mounted; the units 9, which may be electrical or fluid-powered servomotors, engage respective longitudinally and axially offset portions of the axially extending heating elements 6 which are closely juxtaposed with the surface S of the roller to be heated and span a segment thereof.

In FIG. 2, five heating elements are provided and it has already been pointed out that they may be electrically energized in parallel or in a series loop. In FIG. 4, the principle of the electrical connection is illustrated, it being seen that a high-frequency source 21 energizes the transformer 5 which is connected to the heating elements 6 by leads 22. The transformer is thus vertically shiftable (arrow 10) and horizontally shiftable (arrow 10a) with the positioning devices 9 and the heating elements 6.

The positioning devices 9 are, as has been noted, electrical or hydraulic servomotors (see Servomechanism Practice, McGraw Hill, New York, 1960) and can be temperature-responsive via pyrometric temperature sensors 25 which are connected via a usual amplifier 26 and setting control 27 with the servomotors 9 to vary the gap $a$ or $a'$ between one portion of the heating element and another portion of the heating element and the roller as may be required. The variation of the positioning devices may, of course, be recorded and used to program subsequent heating processes.

It may be seen from FIG. 1 (dot-dash lines) that the upper and lower portions of each element 6 may approach the roller 3 to a greater or lesser extent than the other portions of the same element, thereby deforming the heating element as shown in dot-dash lines in FIG. 1 or tilting the heating element as desired. At 6′, we show a portion of another heating system angularly spaced about the roll 3 and it will be understood that one, two or three heating-element stands with associated carriages and positioning devices may be provided.

In FIG. 5, we show a spray head which can be substituted for the heating element 6 and can direct one or more jets of a quenching liquid against the heated surfaces of the roll 3. The transformer 5 is mounted on the carriage 11 and is horizontally shiftable in the direction of arrow 10a by a hydraulic or pneumatic cylinder for the gross displacement of the positioning devices 9 and the transformer 5. The positioning devices 9 are, in turn, carried on the transformer 5 for positioning by the servomotor 13 which can be of the type described in Servomechanism Practice mentioned earlier.

The improvement described and illustrated is believed to admit of many modifications within the ability of persons skilled in the art, all such modifications being considered within the spirit and scope of the invention.

We claim:

1. An apparatus for the heat-treatment of an elongated round metallic body having an axis, comprising:
    means engageable with said body at opposite ends thereof for holding said body rotatably in an upright position;
    means for rotating said body about its axis;
    a support disposed alongside said body;
    at least one induction heating unit mounted on said support and extending longitudinally along said body over substantially the entire length of the part thereof to be heated while confronting only a limited segment of its periphery; and
    a plurality of independently operable positioning means interposed between longitudinally spaced apart portions of said unit and said support for shifting said portions relatively to said body to position the longitudinally spaced apart portion of said unit at different distances from said support.

2. The apparatus defined in claim 1 wherein said induction heating unit is an elongated induction heating element mechanically deformable by said positioning means to establish said distances between two portions of the heating element.

3. The apparatus defined in claim 1 wherein said induction-heating unit comprises a plurality of upright induction-heating elements, each confronting a limited segment of the periphery of said body.

4. The apparatus defined in claim 1, further comprising at least one further support angularly spaced from the first-mentioned support about the axis of said body, at least one induction-heating unit mounted on said support and extending longitudinally along said body while confronting only a respective limited segment of its periphery, and positioning means between said further support and said further induction heating unit corresponding to the first-mentioned positioning means.

5. The apparatus defined in claim 1, further comprising a carriage vertically displaceable on said support and carrying said positioning means and said heating element, and means enabling radial displacement of said carriage relative to said body on said support.

6. The apparatus defined in claim 5, further comprising an induction-heating transformer electrically connected with said induction heating unit and mounted on said carriage for movement therewith.

7. The apparatus defined in claim 6 wherein said induction-heating unit includes a plurality of substantially vertical heating elements electrically connected in parallel.

8. The apparatus defined in claim 6 wherein said induction-heating unit includes a plurality of substantially vertical heating elements electrically connected in a series loop.

9. An apparatus for the heat-treatment of an elongated round metallic body having an axis, comprising:
means engageable with said body at opposite ends thereof for holding said body rotatably in an upright position;
means for rotating said body about its axis;
a support disposed alongside said body and including an upright stand;
at least one induction heating unit mounted on said support and extending longitudinally along said body while confronting only a limited segment of its periphery
respective positioning means interposed between each of said portions and said support for shifting said portions relatively to said body to establish said distances;
a carriage vertically shiftable on said stand and provided with said positioning means, a motor-driven lead screw on said stand engaging said carriage for vertically shifting same, said carriage being provided with a pair of horizontal rails, and a slide horizontally shiftable on said rails and supporting said positioning means; and
a transformer electrically connected to said unit and mounted on said slide below said positioning means for joint movement of said transformer with said unit, said positioning means each constituting a servomotor responsive to the temperature of said body, said body being a roller having a cylindrical central portion adapted to be heat-treated by said unit and a pair of stub shafts affixed to said central portion, said means being engageable with said body at opposite ends thereof and including a first center mounted on said stand for movement parallel to the axis of said body and a second center below said first center engageable with the lower end of said body, said means for rotating said body including a motor proximal to said lower end of said body and an entraining dog driven by said motor and engaging said body for rotating same.

References Cited

UNITED STATES PATENTS

| | | | |
|---|---|---|---|
| 2,368,809 | 2/1945 | Denneen et al. | 219—10.57 |
| 2,706,234 | 4/1955 | Macy | 219—10.79 X |
| 3,188,440 | 6/1965 | Wokas | 219—10.79 X |

JOSEPH V. TRUHE, Primary Examiner

L. H. BENDER, Assistant Examiner

U.S. Cl. X.R.
219—10.59, 10.79